(12) United States Patent
Malone et al.

(10) Patent No.: US 7,336,153 B2
(45) Date of Patent: *Feb. 26, 2008

(54) WIRELESS TEMPERATURE MONITORING FOR AN ELECTRONICS SYSTEM

(75) Inventors: Christopher Gregory Malone, Loomis, CA (US); Thane Michael Larson, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 189 days.

This patent is subject to a terminal disclaimer.

(21) Appl. No.: 11/170,875

(22) Filed: Jun. 30, 2005

(65) Prior Publication Data

US 2007/0001850 A1    Jan. 4, 2007

(51) Int. Cl.
*G08B 1/00* (2006.01)
*G01K 7/00* (2006.01)

(52) U.S. Cl. .............. 340/10.1; 340/10.51; 340/572.1; 340/572.4; 340/584; 340/653

(58) Field of Classification Search ............ 340/572.1, 340/572.4, 10.1, 10.51, 584, 653; 455/558; 702/183, 186
See application file for complete search history.

(56) References Cited

U.S. PATENT DOCUMENTS

| | | | |
|---|---|---|---|
| 5,550,750 A * | 8/1996 | Wolff .................... | 716/10 |
| 5,629,981 A | 5/1997 | Nerlikar | |
| 5,787,321 A * | 7/1998 | Nishikawa et al. ........ | 399/69 |
| 5,907,491 A | 5/1999 | Canada et al. | |
| 5,960,085 A | 9/1999 | de la Huerga | |
| 6,070,240 A | 5/2000 | Xydis | |
| 6,082,623 A * | 7/2000 | Chang .................... | 236/49.3 |
| 6,154,137 A | 11/2000 | Goff et al. | |
| 6,172,596 B1 | 1/2001 | Cesar et al. | |
| 6,401,209 B1 | 6/2002 | Klein | |
| 6,480,809 B1 * | 11/2002 | Slaight ................... | 702/186 |
| 6,747,560 B2 | 6/2004 | Stevens, III | |
| 6,813,209 B2 | 11/2004 | Crain et al. | |
| 6,825,754 B1 | 11/2004 | Rolin | |
| 6,832,251 B1 | 12/2004 | Gelvin et al. | |
| 6,838,989 B1 | 1/2005 | Mays et al. | |
| 6,842,121 B1 | 1/2005 | Tuttle | |
| 6,854,659 B2 * | 2/2005 | Stahl et al. ............. | 236/49.3 |
| 7,031,154 B2 * | 4/2006 | Bash et al. ............. | 361/690 |
| 7,154,378 B1 * | 12/2006 | Ertas et al. ............. | 340/5.85 |

(Continued)

FOREIGN PATENT DOCUMENTS

WO    WO 2004/006051    1/2004

(Continued)

OTHER PUBLICATIONS

Want, Roy, "Enabling Ubiquitous Sensing with RFID," Computer, Invisible Computing, pp. 84-86, (Apr. 2004).

(Continued)

*Primary Examiner*—Jeffery Hofsass
*Assistant Examiner*—Anne V. Lai

(57) ABSTRACT

A method of monitoring an electronics system comprises obtaining temperature information via at least one component of the electronics system, and communicating the temperature information from the at least one component to a manager of the electronics system via a wireless communication pathway independent of the components of electronics system.

16 Claims, 4 Drawing Sheets

U.S. PATENT DOCUMENTS

| | | | |
|---|---|---|---|
| 7,161,489 B2* | 1/2007 | Sullivan et al. | 340/572.4 |
| 7,174,268 B2* | 2/2007 | Katsuki et al. | 702/131 |
| 2001/0044588 A1* | 11/2001 | Mault | 600/549 |
| 2002/0023441 A1 | 2/2002 | Bara et al. | |
| 2002/0183009 A1* | 12/2002 | Cruz-Albrecht et al. | 455/66 |
| 2003/0046339 A1 | 3/2003 | Ip | |
| 2003/0114104 A1 | 6/2003 | Want et al. | |
| 2004/0266480 A1* | 12/2004 | Hjelt et al. | 455/558 |
| 2005/0134461 A1* | 6/2005 | Gelbman et al. | 340/572.8 |
| 2006/0049250 A1* | 3/2006 | Sullivan | 235/385 |
| 2006/0106577 A1* | 5/2006 | Hatakeyama | 702/183 |
| 2006/0200263 A1* | 9/2006 | Knight et al. | 700/117 |
| 2006/0204271 A1* | 9/2006 | Tai et al. | 399/92 |
| 2006/0279412 A1* | 12/2006 | Holland et al. | 340/10.51 |

FOREIGN PATENT DOCUMENTS

| | | |
|---|---|---|
| WO | WO 2005/001642 | 1/2005 |

OTHER PUBLICATIONS

National Semiconductor Corporation, "LM79 Microprocessor System Hardware Monitor," DS100036, pp. 1-30, (2001). <www.national.com>.

National Semiconductor Corporation, "Thermal Management Products," Selection Guide, pp. 5, (Fall 2004).

Gilbert, Alorie, "HP puts RFID on the Rack", CNET News, (2 pgs.), (Nov. 1, 2004), <http://news.zdnet.co.uk>.

Aviation Today, "RFID: The Future of MRO Supply Chain Management", pp. 1-8, (Feb. 2, 2005), <www.aviationtoday.com>.

RFID Journal, "New Low-Cost Temperature Sensor", (2 pgs.), (Feb. 11, 2005), <www.rfidjournal.com>.

Comparetti, Alfredo Milani, SpeedFan, "Access Temperature Sensor in your Computer", (3 pgs.), (2000-2005), <www.almico.com>.

DarkVision Hardware, "Motherboard Monitor 5", (4 pgs.), (Feb. 11, 2005), <www.dvhardware.net>.

* cited by examiner

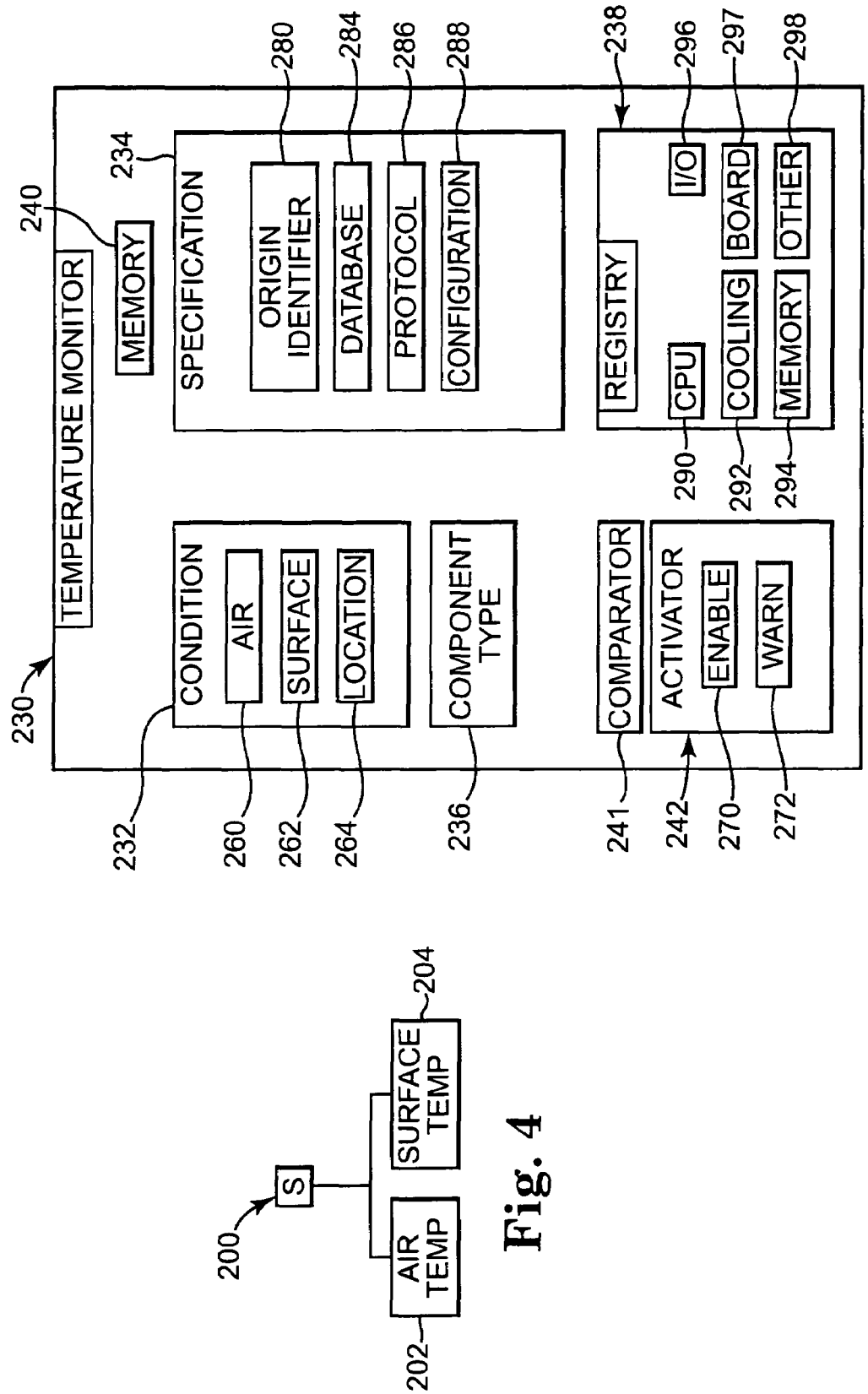

WIRELESS TEMPERATURE MONITORING FOR AN ELECTRONICS SYSTEM

CROSS-REFERENCE TO RELATED APPLICATIONS

This application is related U.S. patent application Ser. No. 11/171,140, entitled "WIRELESS MONITORING FOR AN ELECTRONICS SYSTEM"; and U.S. patent application Ser. No. 11/170,921, entitled "WIRELESS MONITORING OF COMPONENT COMPATIBILITY IN AN ELECTRONICS SYSTEM;" all filed Jun. 30, 2005, and all of which are incorporated herein by reference.

BACKGROUND

Design, manufacture, and assembly of an electronics system, such as a computer system, includes many steps. Because of the very small sizes of electronic components, and their connection via miniature conductive traces on circuit boards, it is becoming more difficult to verify proper design and/or assembly of an electronics system.

Thermal testing in a partially or fully assembled electronics system is time consuming and awkward because of the small size of each component and the compact arrangement of those components together in the electronics system. In particular, introducing external measurement equipment, including thermocouples extending from a wiring assembly, for temperature testing of electronic components is expensive, error-prone, and labor intensive. In addition, this technique makes it difficult to re-use those components for other development activities.

Incorporating thermal sensing circuitry internally within electronic components tends to frustrate primary design goals of the components of the electronics system to maximize function while minimizing size. Internal thermal sensing circuitry also requires calibration and testing. Moreover, adding such circuitry into a component occupies scarce space within the component, as well as occupying pins and traces used to communicate to and from the component. Accordingly, introducing internal circuitry for thermal testing can result in eliminating some functions of the component, or increasing the size of the component.

For these reasons, conventional thermal testing of components and/or electronics systems hampers efficient, accurate evaluation of those components and/or electronics systems.

SUMMARY

Embodiments of present invention are directed to wireless temperature monitoring for an electronics system. In one embodiment, a method of monitoring an electronics system comprises obtaining temperature information via at least one component of an electronics system, and communicating the temperature information from the at least one component to a manager of the electronics system via a wireless communication pathway independent of the components of the electronics system.

BRIEF DESCRIPTION OF THE DRAWINGS

FIG. 4 is a block diagram schematic illustrating a sensor, according to an embodiment of the invention.

FIG. 5 is a block diagram of a temperature monitor, according to an embodiment of the invention.

DETAILED DESCRIPTION

Figure 1:
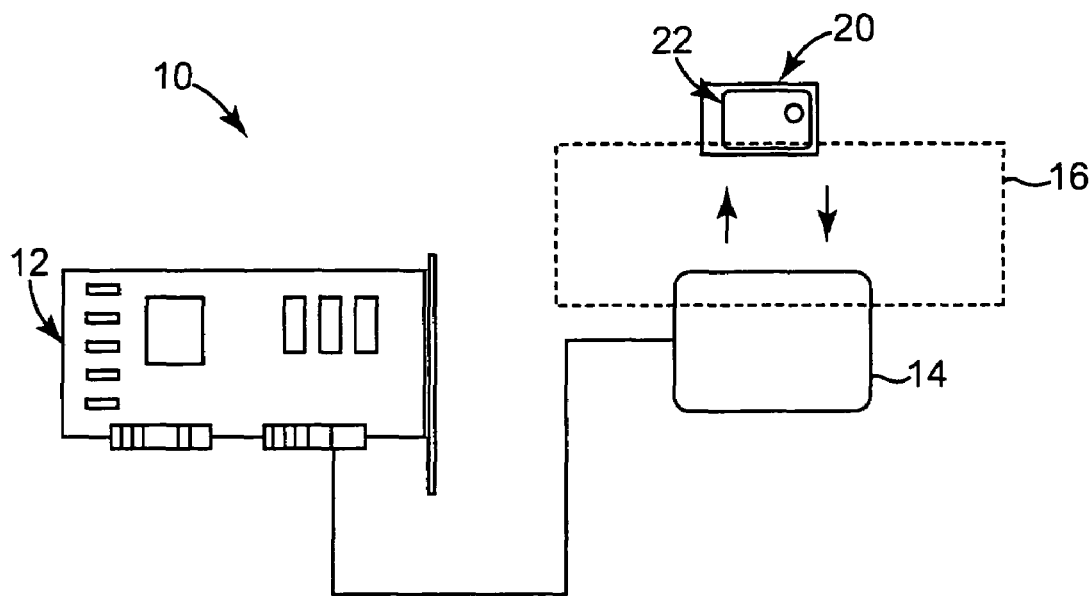
FIG. 1 is a plan view schematically illustrating a RFID system, according to an embodiment of the invention.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Embodiments of the invention are directed to wireless temperature monitoring of an electronics system. One embodiment is directed to a computer system, particularly for monitoring a temperature of components of a computer system, as well as monitoring a temperature of the computer system as a whole. In another embodiment, the electronics system comprises electronic circuitry arranged to provide functions other than computing, such as measurement, sensing, audio, video, control, automation, and many other functions achieved through a system of electronic components acting together.

Wireless monitoring greatly simplifies evaluation of components of an electronics system because it provides a communication pathway independent of other electrical connections forming the electronics system. In one embodiment, a RFID transponder is disposed on select components of the electronics system, which then communicate via radiofrequency signals with a RFID transceiver disposed within or on the electronics system. Each RFID transponder stores information about one or more parameters of the component on which it is disposed and/or communicates information from a sensor (associated with the transponder) that detects such parameters regarding the component.

In one embodiment, the RFID transponder comprises a sensor that detects temperature information at a surface of a component or within the air adjacent the component. In another embodiment, this temperature information is stored in the memory of the RFID transponder.

Each RFID transponder is placed on an exterior of components of the electronics system, so as not to occupy valuable space within the component. In one embodiment, a RFID transponder is formed as a tape, label, or thin card adhesively secured to the exterior of the component, thereby enabling simple, robust attachment of the RFID transponder to a component. Moreover, because each transponder communicates wirelessly with a RFID transceiver, no wired pathway passes through the component. Accordingly, each component of a computer system need not be modified to accommodate this wireless monitoring technique. In one embodiment, a RFID transponder is located on an interior of a component (separate from other internal circuitry of the component) when space permits, as might be available in larger components.

Via wireless temperature monitoring of components, simpler more effective ways to manage, test, and evaluate an electronics system, such as a computer system, are enabled. In one example, communication between a RFID transceiver of the electronics system and the RFID transponder of each component is used to insure that an electronics system has been proper designed and assembled into the configuration intended by the manufacturer. In particular, this wireless temperature monitoring greatly aids thermal design validation by enabling remote temperature sensing without introducing external measurement equipment such as thermocouples and their attendant wiring assemblies. Instead, with embodiments of the invention, each component already includes its own temperature sensor.

In one embodiment, an RFID transponder with a temperature sensor is disposed on conventional industry standard components, such as a hard drive or DRAM module that do not have integrated temperature sensors. This implementation allows the use of low-cost components and avoids the cost and complexity of integrating temperature sensors into these components. By using wireless communication pathways (via a RFID transponder tag and RFID transceiver), these components and a larger system can be monitored and controlled to meet enterprise IT equipment reliability goals.

In another example, temperature information about the electronics system, and its specific components, is gathered via the RFID transponders and the RFID transceiver to facilitate maintenance and repair of one or more components of the electronics system. This temperature information also can be used to make adjustments in a thermal solution of the electronics system in response to environmental changes or the failure of a system fan. In one embodiment, in addition to sensing temperatures, an RFID transponder additionally enables tracking of a component through factory production, distribution, transportation, etc.

Accordingly, embodiments of the invention enable new ways of monitoring a temperature of electronics systems and their components via wireless communication pathways. Embodiments of the invention are described and illustrated in detail in association with FIGS. 1-6.

In one embodiment of the invention, a wireless communication pathway is established via radiofrequency waves, and in particular via a radiofrequency identification (RFID) system. Accordingly, one exemplary embodiment of a RFID system is described and illustrated in association with FIGS. 1-2 as a foundation for a description of wireless temperature monitoring of electronics systems, as described and illustrated in association with FIGS. 3-6.

FIG. 1 illustrates radio frequency identification (RFID) system 10. RFID system 10 includes transceiver 12 and transponder 20. Transceiver 12 includes transceiver antenna 14. Transponder 20 includes transponder antenna 22. Signals generated by transceiver antenna 14 and by transponder antenna 22 are transferred through medium interface 16.

Transceiver 12 of RFID system 10 is configured to communicate with transponder 20. In one embodiment, transceiver 12 includes a microprocessor, and in another embodiment, transceiver 12 is coupled to a host system that includes a microprocessor. In one embodiment, transceiver antenna 14 is integrated within a single transceiver device. In one embodiment, transceiver 12 includes a separate transceiver circuit device and a separate transceiver antenna 14. Transceiver antenna 14 emits radio frequency signals that are transmitted through medium 16 to activate transponder 20. After activating transponder 20, transceiver 12 reads and writes data to and from transponder 20. Transceiver antenna 14 and transponder antenna 22 are the conduits between transceiver 12 and transponder 20, and communicate radio frequency signals through medium interface 16.

In some embodiments, medium interface 16 is air, and in other embodiments medium interface 16 includes air and other materials. Transceiver antenna 14 and transponder antenna 22 can be of a variety of shapes and sizes, dependent upon the anticipated distance separating them, the type of medium 16 that is between antennas 14 and 22, and on other factors.

Transceiver 12 typically performs a variety of functions in controlling communication with transponder 20. In one case, transceiver 12 emits output signals from transceiver antenna 14, thereby establishing an electromagnetic zone for some distance adjacent antenna 14. When transponder 20 passes through the electromagnetic zone established by transceiver antenna 14, transponder 20 detects an activation signal from transceiver 12. Transponder 20 typically has integrated circuits that include data that is encoded in memory. Once transponder 20 is activated with the activation signal, transceiver 12 decodes data that is encoded in transponder 20. For instance, in one embodiment transceiver 12 performs signal conditioning, parody error checking and correction.

Typically, transceiver 12 emits radio waves in ranges from a few millimeters up to hundreds of feet or more, depending on its output power and upon the radio frequency used. In one case, transceiver 12 is integrated in a circuit board card that is then coupled to a host computer, which processes the received data and controls some of the communication with transponder 20.

Figure 2:
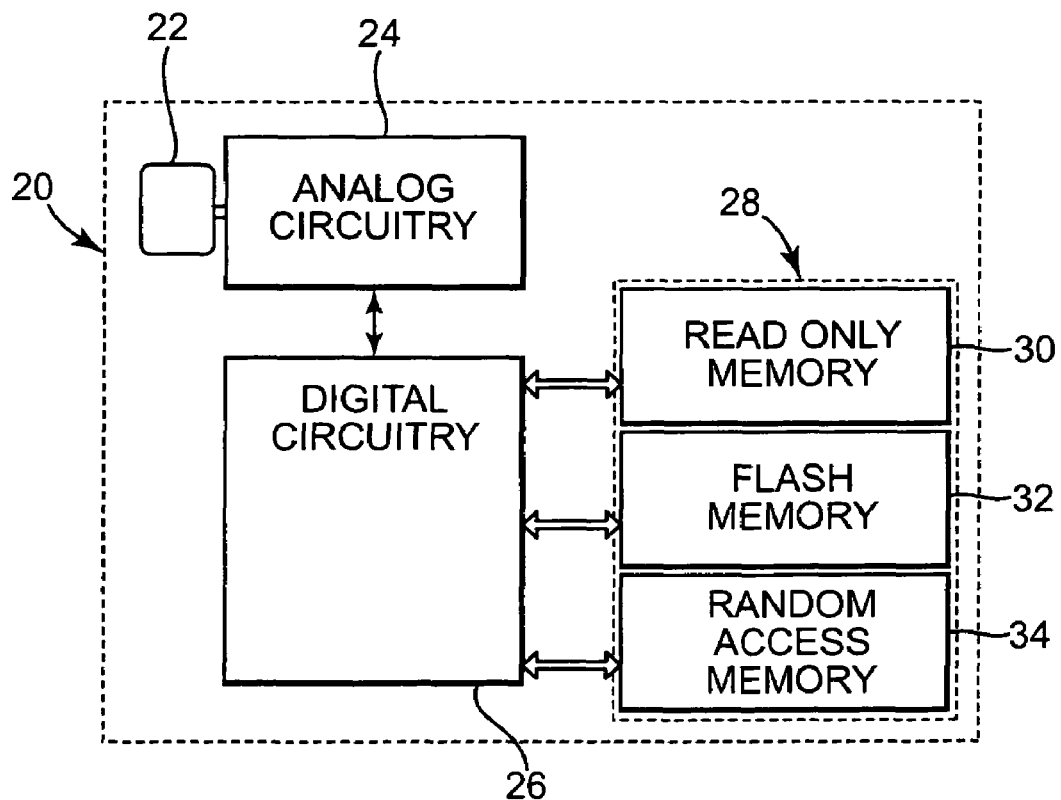
FIG. 2 is a block diagram of a transponder of a RFID system, according to an embodiment of the invention.

FIG. 2 illustrates one embodiment of transponder 20. In one case, transponder 20 includes transponder antenna 22, analog circuitry 24, digital circuitry 26, and memory 28. In various embodiments, memory 28 can include read only memory (ROM) 30, flash memory 32, and/or random access memory (RAM) 34.

Transponder 20 comes in a variety of shapes and sizes for use in a variety of applications. In one embodiment, transponder 20 is a tag, thin card, or tape that is securable to the component of the computer system. In one aspect, the transponder 20 is adhesively securable to the component. In other embodiments, transponder 20 is configured as a small cylindrical-shaped tube, screw-shaped (such that it is securable into a circuit board), or credit-card shaped, each of which are securable to a component of the computer system.

In some embodiments, transponder 20 includes one or more types of memory 28. For example, in some embodiments memory 28 includes ROM 30 to accommodate security data and operating system instructions that are employed in conjunction with analog circuitry 24 and digital circuitry 26 to control the flow of data within transponder 20. In other embodiments, memory 28 includes RAM 34 to facilitate temporary data storage during a time period when transceiver 12 is interrogating transponder 20 for a response. In other embodiments, memory 28 includes flash memory 32 to store data in transponder 20 that is non-volatile in order to ensure that the data is retained when transponder 20 is in a quiescent or power saving state. In some embodiments, memory 28 includes other types of non-volatile programmable memory, such as programmable read-only memory (PROM), erasable programmable read-only memory (EPROM), and electrically erasable programmable read-only memory (EEPROM). Any one of memory types ROM 30, flash memory 32 (or other non-volatile programmable memory), or RAM 34 can be used, or any combination thereof can be used.

In one embodiment, transponder 20 is an active transponder device. An active transponder is powered by an internal energy source, such as a battery configured within analog circuitry 24. Such active transponders are typically "read/write," which means data stored within memory 28 of transponder 20 can be rewritten and/or modified. An active transponder can also be powered from an existing source in another electronic device. For example, where transponder 20 is an active transponder coupled within a computer system, the power supply within the computer system supplies power to the transponder.

In one embodiment, transponder 20 is a passive transponder device. Passive transponders operate without a separate internal power source and obtain operating power from transceiver 12. Rather than having a battery within analog circuitry 24, for example, passive tags instead can use a strongly capacitive circuit and a charge pump within analog circuitry 24. The capacitive circuit and charge pump are configured to receive radio frequency energy from transceiver 12 and store it for use within transponder 20, for example, to control digital circuit 26 and memory 28.

Since active transponders accommodate an internal battery, they are typically larger in size than passive transponders. Memory size within an active transponder varies, but can be fairly significant with some systems operating, for example, with up to a megabyte or more of memory. Active transponders also typically have a longer ready range such that transceiver 12 and transponder 20 are typically placed apart at greater distances than in the case of passive transponders. In the same way, passive transponders typically have shorter read ranges, but are typically much smaller and lighter than active transponders and are typically less expensive.

In addition to including a battery for active transponders or capacitive circuit and charge pump for passive transponders, analog circuitry 24 typically include interface circuits for data transfer between transponder antenna 22 and digital circuitry 26. Digital circuitry 26 in turn typically includes control logic, security logic, and internal logic or microprocessor capabilities. This control logic controls the flow of data to and from memory 28.

Accordingly, transceiver 12 and transponder 20 together establish a robust wireless communication pathway or network adaptable to a variety of environments.

According to one embodiment of the invention, transceiver 12 and one or more transponders 20 are arranged within an electronics system to enable wireless temperature monitoring of an electronics system, such as computer system 100, and its components. In another embodiment, the electronics system, or portions of the electronics system, comprises electronic circuitry arranged to provide functions other than computing, such as measurement, sensing, audio, video, control, automation, and/or many other functions achieved through a system of electronic components acting together.

Figure 3:
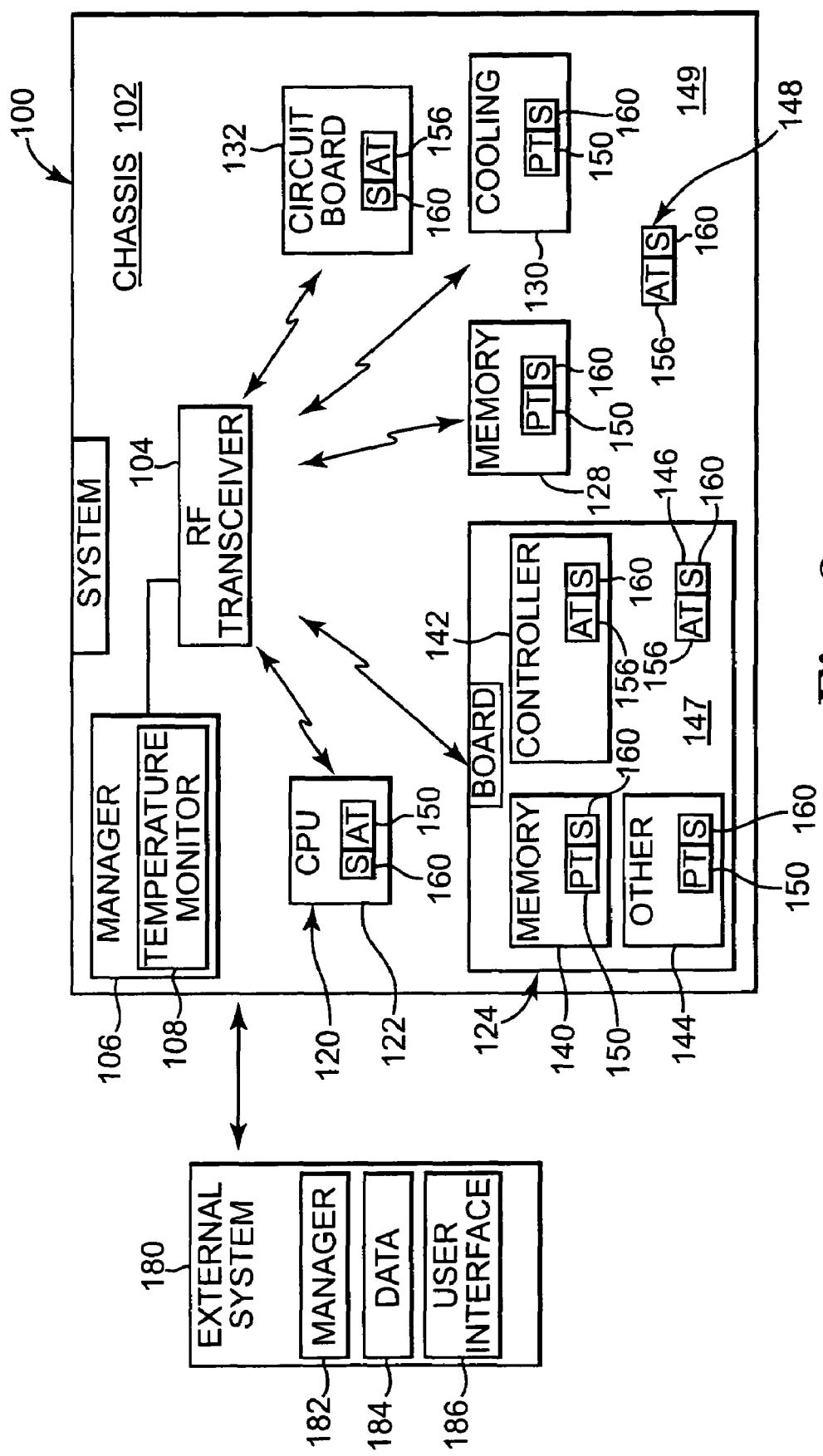
FIG. 3 illustrates an electronics system, according to an embodiment of the invention.

FIG. 3 is a block diagram of computer system 100 including one such wireless temperature monitoring mechanism, according to one embodiment of the invention. As shown in FIG. 3, computer system 100 comprises chassis 102, RFID transceiver 104, manager 106 with temperature monitor 108, and array 120 of components 122-132. These components of array 120 include, but are not limited to, central processing unit (CPU) 122, electronics board 124, memory 128, cooling unit 130 (e.g., a system cooling fan, a component cooling fan, etc), and circuit board 132. In one embodiment, cooling unit 130 comprises a system fan or a component fan. In one embodiment, electronics board 124 comprises a peripheral component interface (PCI) card, such as a graphics card, a video card, an audio card, a television tuner card, a modem card, a firewire card, a universal serial bus (USB) card, etc. In one embodiment, electronics board 124 comprises one or more of memory 140, controller 142, and other component 144.

One or more components of array 120, including the components of electronics board 124, also comprise passive transponder (PT) 150 or active transponder (AT) 156. In addition, in one embodiment, one or more of the passive transponder(s) (PT) 150 or active transponder(s) (AT) 156 comprise sensor 160. In another embodiment, an independent sensor 147 is disposed on a surface of electronics board, apart from an individual component of electronics board 124, and comprises active transponder (AT) 156 (or passive transponder) with sensor 160. Similarly, in another embodiment, an independent sensor 148 is disposed on a surface of chassis (or other framework), apart from an individual component of electronics system 100, and comprises active transponder (AT) 156 (or passive transponder) with sensor 160.

Transponders 150,156 have substantially the same features and attributes of transponder 20, and transceiver 104 has substantially the same features and attributes as transceiver 12, previously described and illustrated in association with FIGS. 1-2. Sensor 160 is further described and illustrated in association with FIG. 4.

As shown in FIG. 3, chassis 102 is a frame or other portion of a framework supporting array 120 of components 122-132 and transceiver 104. Manager 106 comprises an on-board manager for monitoring and controlling operation of components 122-132 of computer system 100, and is in wired communication with transceiver 104. In one aspect, manager 106 comprises a server manager when computer system 100 comprises a server. Temperature monitor 108 of manager 106 enables monitoring temperature parameters of each component of computer system 100, and is further described and illustrated in association with FIG. 5.

Passive transponder 150 and active transponder 156 convey information to manager 106 via transceiver 104 about a component (on which they are secured or adjacent to) such as one or more parameters of the component. The information is either stored in a memory (e.g., memory 28, FIG. 1-2) of transponder 150,156 or detected via sensor 160 for transmission to transceiver 104. In one embodiment, temperature information detected by sensor 160 is stored in a memory of transponder 150,156 for later communication to transceiver 104.

The parameters of the components of computer system 100 reveal information about a specific condition (e.g., surface temperature or air temperature), operating characteristic, or specification of the component. When this information, such as temperature information, is collected from several different components via manager 106, temperature information about the entire computer system 100, as well as each component, is available for use to monitor computer system 100. Accordingly, a variety of transponders, either active or passive, and with a temperature sensor, is applied to one or more components of a computer system to create a wireless network for temperature monitoring of the computer system.

As shown in FIG. 3, in one embodiment central processing unit 122, memory 128, and cooling unit 130 (e.g., a system cooling fan, component cooling fan, etc) each include passive transponder 150 including sensor 160. In another embodiment, passive transponder 150 does not include a sensor, such as sensor 160 when temperature monitoring of a selected component is not desired. In one embodiment, circuit board 132 comprises active transponder 156 with a sensor 160.

In one embodiment, active transponder (AT) 156 comprises a larger memory than a memory of passive transponder (PT) 156 and the ability for transceiver 104 to write information to active transponder (AT) 156 regarding a parameter of a component or the computer system.

In one embodiment, sensor 160 is incorporated into transponder(s) 150, 156 while in other embodiments, sensor 160 is external to transponder(s) 150, 156 but in communication with, and associated with a respective transponder 150, 156.

In still other embodiments, other combinations of passive transponders (PT) 150, active transponder(s) 156, and sensor(s) 160 are used on components so that the wireless communication network of transponders 150, 156 and transceiver 104 is not limited to the example shown in FIG. 3. Any component can have either a passive transponder 150 or an active transponder 156, and may or may not have a sensor 160. Selection of which type of transponder 150, 156 is used, and whether or not a sensor 160 is included, depends on the type of component being monitored, as well as the type of information or parameters being monitored. Of course, for each component for which sensing of temperatures is to be performed, those components include a sensor 160.

As shown in FIG. 3, transceiver 104 is disposed within or on chassis 102 of computer system 100 in range for communication with transponders 150, 156. Accordingly, each transponder 150, 156 is in wireless communication with transceiver 104. Because the communication between transponders 150, 156 and transceiver 104 is performed via radiofrequency waves, this wireless communication occurs independent of physical wires or conductive trace paths between the components (122-132) on chassis 102 and manager 106 or transceiver 104. Moreover, transponders 150, 156 are not formed as part of the computer components, thereby avoiding modification of those components to implement the wireless communication network. Accordingly, transponders 150, 156 enable a communication pathway that does not occupy pins or conductive pathways within components (120-132) nor on chassis 102 or any circuit boards supporting components 120-132.

In one embodiment, transceiver 104 obtains its power from a source (e.g., an internal battery) different than components of computer system so that the independent communication pathway of transceiver 104 and transponders 150, 156 enable wireless monitoring of components of computer system 100 even when computer system 100 is not powered up. This feature enables verifying a configuration of computer system 100 prior to power being supplied to the components of the computer system 100.

Accordingly, transponders 150, 156 and transceiver 104 enable an wireless communication network that is transparent to the normal function and operation of components of the computer system, and which is easily implemented by simply securing the transponders to a component for which monitoring is desired.

As shown in FIG. 3, in one embodiment, computer system 100 is in communication with external computer system 180, which includes manager 182, data module 184, and user interface 186. User interface 186 is configured to display and enable operation of manager 182 of external system 180 and/or of manager 106 of computer system 100. In one embodiment, manager 182 is configured to manage operations of a plurality of computer systems, including computer system 100, so that manager 182 acts as a central monitoring station of several computer systems, each of which have their own wireless monitoring mechanism.

FIG. 4 is an illustration of different types of sensors used with transponder 150, 156, according to one embodiment of the invention. As shown in FIG. 4, sensor 200 represents any one of sensors 160 in FIG. 3. Sensor 200 comprises one or more of air temperature sensor 202 and surface temperature sensor 204. Not every sensor is appropriate for each component of computer system 100 (FIG. 3), so that appropriate types of sensors are associated with components for which the sensor can detect a parameter appropriate for that component. Air temperature sensor 202 is configured to detect an ambient air temperature within electronics system 100, such as adjacent air flow pathways, or adjacent a component. Surface temperature sensor 204 is configured to detect a temperature at the surface of a component on which sensor 200 is secured or positioned. One type of a temperature sensor incorporated into a RFID transponder, and securable as a label, is available from KSW Microtec of Dresden, Germany.

Upon sensing a temperature via one of sensors 200, the RFID transponder 150, 156 stores a digital representation of the temperature measurement in a memory of transponder 150, 156. RFID transceiver 104 then interrogates each of transponder(s) 150, 156 and receives the digitized measured signal using a simple bit protocol along with identification bits for each of the transponder(s) 150, 156 corresponding to a specific component of the computer system. Thus, the identification bits will identify the transponder 150, 156 from which the measurement came, thereby identifying the component at which the measurement was taken. Software translates the received data and associates each transponder(s) 150, 156 with each measurement location, i.e. a location of the component within computer system 100.

FIG. 5 is a block diagram of temperature monitor 230, according to one embodiment of the invention. Temperature monitor 230 is configured to facilitate monitoring parameters of the components of computer system 100, and has substantially the same features and attributes as temperature monitor 108 of manager 106 (FIG. 3), and additional features described herein.

As shown in FIG. 5, temperature monitor 230 comprises conditions module 232, specifications module 234, component type parameter 236, registry 238, memory 240, comparator 241, and activator 242.

Specifications module 234 of temperature monitor enables manager 106 (FIG. 3) to maintain information about the performance specifications or operating parameter of an electronics system, such as computer system 100, against which performance specifications or operating parameters of a specific component can be compared and evaluated. In one embodiment, the performance specifications and/or operating parameters are related to a temperature of a component and/or the computer system 100.

In one embodiment, specifications module 234 comprises origin identifier 280, database 284, protocol parameter 286, and configuration parameter 288. Origin identifier 280 identifies a release date, serial number, manufacturer designation or other information indicating something about an origin of a component. Database 284 comprises a database of parameters of various components and of electronics system as a whole. Via origin identifier 280, various operating parameters regarding a component can be obtained from database 284. Information within database 284 acts as a predetermined criteria of computer system 100 against which parameters of the components are evaluated.

Protocol module 424 maintains information about all of the electrical protocols governing compatibility of the components regarding signals, power, temperatures, etc. to enable evaluating a new component for compatibility with existing protocols implemented in computer system 100. In one embodiment, protocol module 424 includes, but is not limited to, one or more of a power management protocol, plug and play (PnP) protocol, peripheral component interface (PCI), etc. Configuration parameter 288 comprises information about the specific configuration of electronics system 100 and/or other electronic devices, such as board 124 (FIG. 3), which assists in evaluating temperature information sensed at a component and/or within computer system 100.

Memory 240 comprises firmware, hardware, internal and/or external media devices used to store temperature monitor 230 and all of the values or settings of the parameters of temperature monitor 230.

Conditions module 232 enables monitoring of various current temperature conditions of a component of computer system, with the conditions obtained from a memory of the component and/or via detection by a sensor of a transponder of the component. Conditions module 232 comprises air temperature parameter 260, surface temperature parameter 262, and/or location parameter 264.

Air temperature parameter 260 identifies an ambient air temperature adjacent a component and/or generally within the computer system 100. Surface temperature parameter 262 identifies a temperature of a component at a surface of that component. Location parameter 268 identifies a location of a component within computer system, and in some embodiments, represents location information from position-locating elements operating in association with transponders 150, 156 for identifying a location of a component. In another embodiment, the location of a component is determined from reading an ID bit accompanying a digital measurement signal that is obtained by RFID transceiver 104 from a RFID transponder 150, 156 at the component and associated with the sensor making the measurement, as previously described in association with FIG. 4. Information from location parameter 268 enables mapping multiple temperature readings, with each separate temperature reading being associated with a different component or region of computer system 100 so that a map of sensed temperatures within computer system 100 can be created.

In one embodiment, configuration parameter 288 also automatically updates a configuration of the computer system as components are added or removed from computer system 100 since a new component installed in computer system with a transponder 150, 156 will be enabled for communication with transceiver 104 and a component removed from computer system 100 will no longer be able to communicate with transceiver 104.

Component type parameter 236 tracks the types of components of a computer system, so that as transceiver 104 interrogates a transponder 150, 156 of a respective component, transponder 150, 156 reports to transceiver 104 the type of component (e.g., CPU, memory, power, cooling, etc.) with which transceiver 104 is communicating. In one embodiment, the component type parameter 236 of temperature monitor 230 enables a computer system manager (e.g., manager 106 of FIG. 3) to determine and confirm a configuration of a computer system by tracking all of the different types of components forming computer system.

Registry 238 tracks the presence of components of computer system 100 to display a listing of which components are being tracked in computer system via the wireless monitoring system. As shown in FIG. 5, in one example, registry 238 lists central processing unit (CPU) 290, cooling unit 292, memory 294, input/output unit 296, board 297 (e.g., circuit board, motherboard, etc.) and other component 298 (e.g., a power unit) as components being tracked/sensed via wireless temperature monitoring in computer system 100. In one aspect, registry 238 enables selection of a component to specify which component that other modules (e.g., conditions module, specifications module) of temperature monitor 230 will display information about or write information to. In one embodiment, registry 238 acts in cooperation with configuration parameter 288 to track components relative to an overall configuration of the computer system 100, and in other respects previously described in association with configuration parameter 288.

Comparator 240 performs the comparison of temperature information of a component with parameters of other components of the computer system and/or the computer system as a whole. In one embodiment, comparator 240 compares a temperature sensed at or near a component with performance specifications and/or operating parameters of that component, of other components, and/or of the computer system 100.

Activator 242 controls activation of components of computer system 100 to assist in managing a temperature of a component and/or computer system. In one embodiment, enable function 270 of activator 242 enables cooling unit 130 (e.g., a system fan, component fan, etc) to cause air flow or other cooling mechanisms to act on computer system and/or its component to affect the temperature of the computer system and/or a component.

Warn function 272 of activator 440 warns a user, via manager 106 (FIG. 3), of a temperature of a component and/or computer system that exceeds or is less than a performance specification and/or operating parameter of the component and/or computer system. Alternatively, warn function 272 can be replaced by an okay function which identifies to the operator that a temperature of a component and/or the computer system is within a performance specification and/or operating parameter of the component and/or computer system, respectively.

Figure 6:
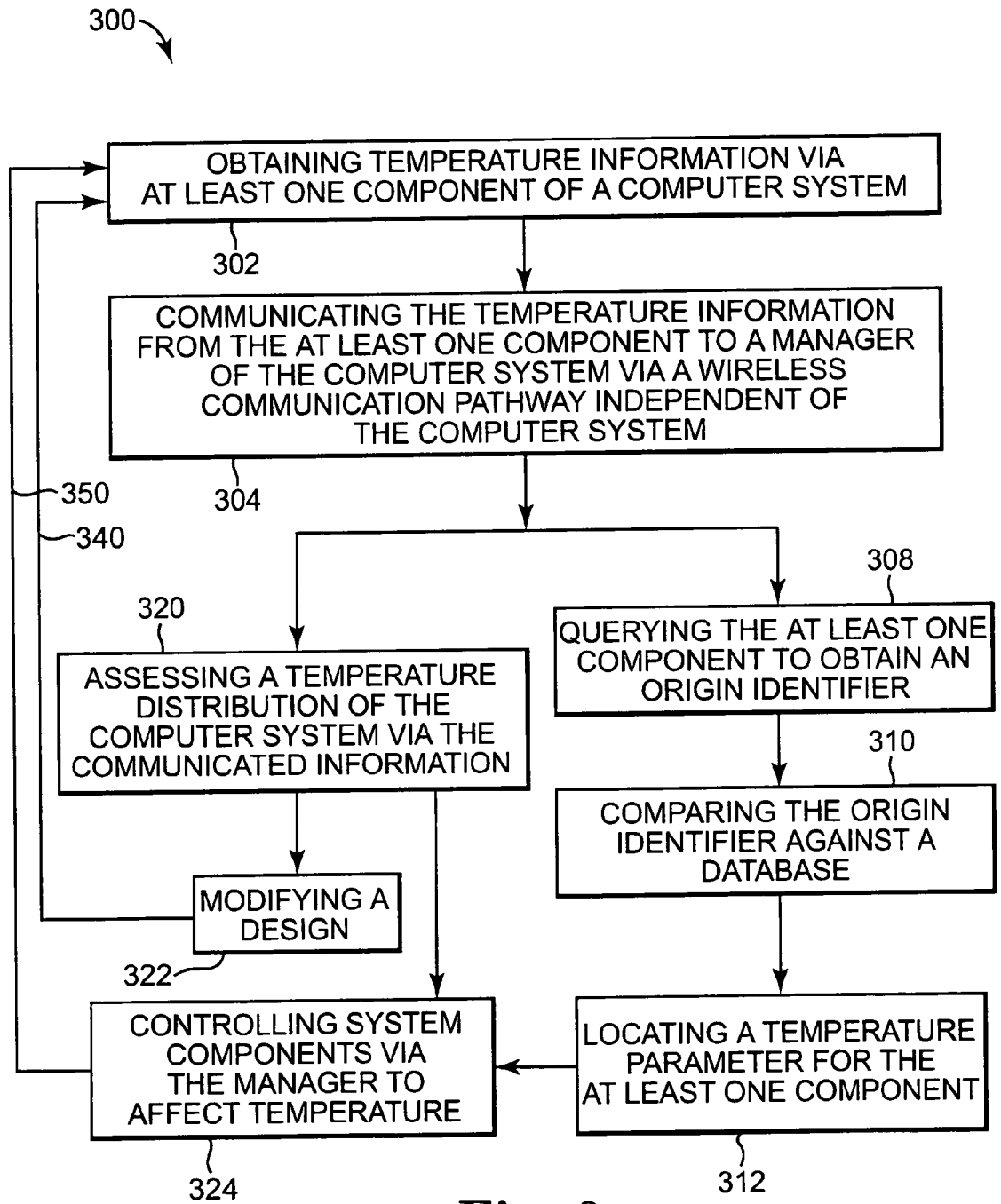
FIG. 6 is a flow diagram of a method of monitoring an electronics system, according to an embodiment of the invention.

FIG. 6 is a flow diagram of a method 300 of monitoring a computer system, according to one embodiment of the invention. In one embodiment, the systems described and illustrated in association with FIGS. 1-5 are used to perform method 300.

As shown in FIG. 6, at 302 method 300 comprises obtaining temperature information via at least one component of a computer system. At 304, the temperature information is communicated from the at least one component to a manager of the computer system via a wireless communication pathway independent of the components of the computer system. In one embodiment, this wireless communication pathway is embodied in a RFID transceiver associated with the computer system and a RFID transponder associated with selected components of the computer system. The wireless communication takes place between the RFID transceiver and the one or more RFID transponders so that no wires, traces, pins or other portions of components of the computer system are used to enable this communication pathway for monitoring the computer system.

In another embodiment, at 308 method 300 comprises querying the at least one component to obtain an origin identifier of the at least one component. At 310, the origin identifier of a component is compared against a database, such as database 284 of specifications module 234 in FIG. 3, of component information to obtain detailed information about parameters of the component. The database can be internal to a computer system, such as within a manager of the computer system (e.g., database 284 of specifications module 234 in FIG. 5), or external to a computer system (e.g., database 184 of external system 180 in FIG. 3).

In one embodiment, at 312 a temperature parameter is located (via the database and origin identifier) for the at least one component to enable evaluating the significance of a temperature sensed at the component and/or within the computer system 100.

In one embodiment, at 320 method 300 comprises assessing a temperature distribution of the computer system, including a temperature of individual components, via the wirelessly communicated information.

In one embodiment, after assessing a temperature distribution of the computer system (e.g., as at 320) or after locating a temperature parameter of a component (e.g., as at 312), method 300 comprises controlling components of computer system via temperature monitor 230 and/or manager 106 to affect the temperature of a component and/or the computer system. In one embodiment, this action includes activating a system cooling fan to decrease a temperature or deactivating a system cooling fan to increase a temperature. In another embodiment, this action includes activating a component that generates heat (directly or indirectly) to increase a temperature or deactivating a component that generates heat to decrease a temperature. In another embodiment, method at 324 includes taking no action to affect a temperature of the computer system and/or its components.

At 350 method 300 follows a feedback path to 302 wherein the temperature is again obtained in response to the action, and method 300 repeated to determine if the sensed temperatures are acceptable relative to a temperature distribution of the computer system (e.g., as at 320) and/or relative to a temperature parameter of the component and/or computer system.

In one embodiment, at 322 method 300 comprises modifying a design of a component and/or the computer system in response to assessing a temperature distribution of the computer system (or a temperature of a component within that distribution). Based on the modified design, method 300 proceeds along feedback pathway 340 to once again obtain a temperature of a component and/or the computer system. Method 300 is repeated until a satisfactory design is achieved that maintains a temperature of a component, of a portion of a computer system, or the computer system as a whole within an acceptable range. In one embodiment, at 322 a design of a component and/or the computer system is not modified when a satisfactory temperature is measured.

Accordingly, a method of monitoring a temperature of a computer system, and its individual components, via a wireless communication pathway enables verification of proper thermal design of the computer system and facilitates on-going operation, maintenance and repair of the computer system.

Embodiments of the invention greatly simplify the task of implementing a temperature monitoring system into an electronics system by effectively permitting the overlay of wireless communication mechanisms outside of the normal functions and operations of the components of an electronics system. Parameters of each component, which are stored at the component or detected at the component, are communicated to a manager of the electronics system. These features alleviate tedious conventional temperature measurements of an electronics system, and enhance the efficiency of design, evaluation, maintenance and repair of an electronics system.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer comprising:
   a computer frame;
   a RFID transceiver disposed on the frame;
   at least one computer component disposed on the frame, the at least one computer component comprising at least one of a central processing unit, a memory unit, and a circuit board;
   a temperature sensor disposed on the at least one computer component;
   a RFID transponder removably secured, as a label, relative to the at least one computer component, the RFID transponder being independent of circuitry of the at least one computer component and the RFID transponder comprising a memory configured to store a temperature sensed via the temperature sensor and to store an origin identifier of the at least one computer component; and
   a manager configured to obtain, via the origin identifier of the at least one computer component, a temperature performance specification of the at least one component, wherein the manager is also configured to affect a target temperature of the at least one computer component of the computer based on the sensed temperature and on the temperature performance specification of the at least one computer component, respectively,
   wherein the RFID transceiver and the RFID transponder are configured for wireless communication with each other, without communication between the RFID transponder and the circuitry of the at least one computer component, regarding the sensed temperature and the origin identifier of the at least one computer component.

2. The computer of claim 1 wherein the circuit board comprises a peripheral component interface card and the RFID transponder is disposed on at least one of a memory and a controller on the peripheral component interface card.

3. The computer of claim 1 wherein the RFID transponder comprises a sensor for detecting the temperature parameter of the at least one component as at least one of a surface temperature of the at least one component and an air temperature adjacent the at least one component within the electronics system.

4. The computer of claim 1 and further comprising:
   a temperature monitor configured to monitor the temperature parameter of the at least one component of the electronics system wherein the temperature monitor comprises at least one of:
   a component type module;
   a conditions module;

a specifications module;
a comparator module; and
an activator module.

5. The computer of claim 4 wherein the conditions module comprises at least one of:
a surface temperature parameter; and
an air temperature parameter.

6. The computer of claim 4 wherein the specifications module comprises at least one of:
an origin identifier parameter;
a database of information regarding the at least one component and the electronics system;
a protocol parameter; and
a configuration parameter.

7. The computer of claim 1, and further comprising:
an external computer system in communication with the electronics system and configured to monitor the electronics system including monitoring the temperature parameter via the RFID transponder of the electronics system.

8. The computer of claim 1 wherein the electronics system comprises a computer system, and the at least one component comprises a computer system component.

9. A method of monitoring a computer, the method comprising:
providing a plurality of computer components of a computer;
removably securing a temperature sensor and a RFID transponder onto each respective computer component;
sensing temperature information via the sensor of each respective computer component and storing the sensed temperature information in a memory of the RFID transponder of each respective computer component; and
communicating the temperature information from the RFID transponder to a RFID transceiver adjacent a position of the manager of the computer via a wireless communication pathway independent of communication with each respective computer component of the computer;
evaluating a temperature distribution, via the stored temperature information for each respective computer component, of the respective computer components of the computer relative to a thermal design parameter of the computer, wherein the thermal design parameter of the computer includes a temperature performance specification of each respective computer component; and
modifying a thermal design of the computer, via replacing one of the respective computer components, based on the evaluated temperature distribution of the respective components of the computer.

10. The method of claim 9 wherein sensing the temperature information comprises sensing at least one of a surface temperature of the respective computer component and an air temperature within the computer.

11. The method of claim 9 wherein communicating the temperature information comprises:
identifying, via the manager, the temperature performance specification of each respective computer component via an origin identifier of each respective computer component; and
controlling operation of the computer, including each respective computer component, via the manager to affect a temperature of the computer based on the identified temperature performance specification and the sensed temperature information.

12. The method of claim 11 and further comprising: repeating sensing the temperature information and communicating the temperature information.

13. A server comprising:
a plurality of server components arranged in a predetermined configuration on a chassis as a server;
a RFID transceiver disposed on the chassis;
an array of RFID transponders in wireless communication with the RFID transceiver with at least one RFID transponder of the array mounted on each respective server component of the plurality of server components, wherein each RFID transponder comprises a memory and a temperature sensor, the memory configured to store a temperature measured by the temperature sensor and to store an origin identifier of each respective server component; and
a server manager in communication with the RFID transceiver and including a temperature monitor configured to monitor a temperature of each respective server component of the server system, via wireless communication between the RFID transceiver and the at least one RFID transponder of the respective server components, without communication between the at least one RFID transponder and the respective server component on which the at least one RFID transponder is mounted,
wherein the server manager is configured to obtain, via the origin identifier of the respective server component, a temperature parameter of the respective server component, and wherein the server manager is also configured to affect a target temperature of the respective server component based on the sensed temperature and the temperature parameter of the each respective server component.

14. The server of claim 13 wherein at least one of the respective server components comprise at least one of a central processing unit, a memory unit, and a circuit board.

15. The server of claim 13 wherein the at least one parameter comprises:
a conditions module configured to provide information about a current condition of the at least one server component, the information including at least one of a surface temperature parameter, an air temperature parameter, and a location parameter.

16. The server of claim 13 wherein the temperature monitor comprises:
a specifications module configured to provide information about a specification of the at least one server component and of the server system, the specifications module including at least one of:
a database of information about the at least one server component and the server system;
a protocol parameter; and
a configuration parameter.

* * * * *